May 23, 1967　　　J. R. GROVER ETAL　　　3,321,409
PRODUCTION OF RADIOACTIVE FUSED GLASS BODIES
Filed Aug. 31, 1964
2 Sheets-Sheet 2
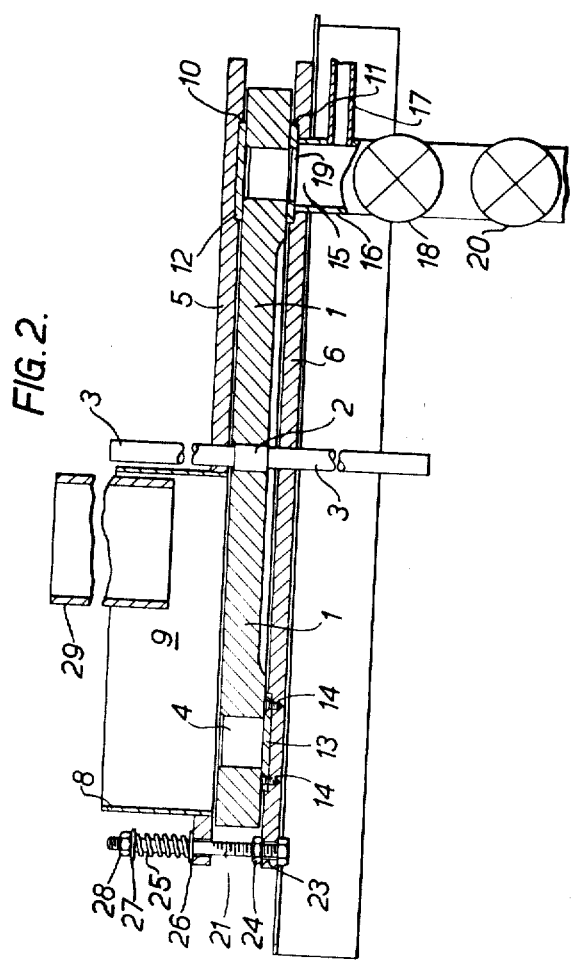

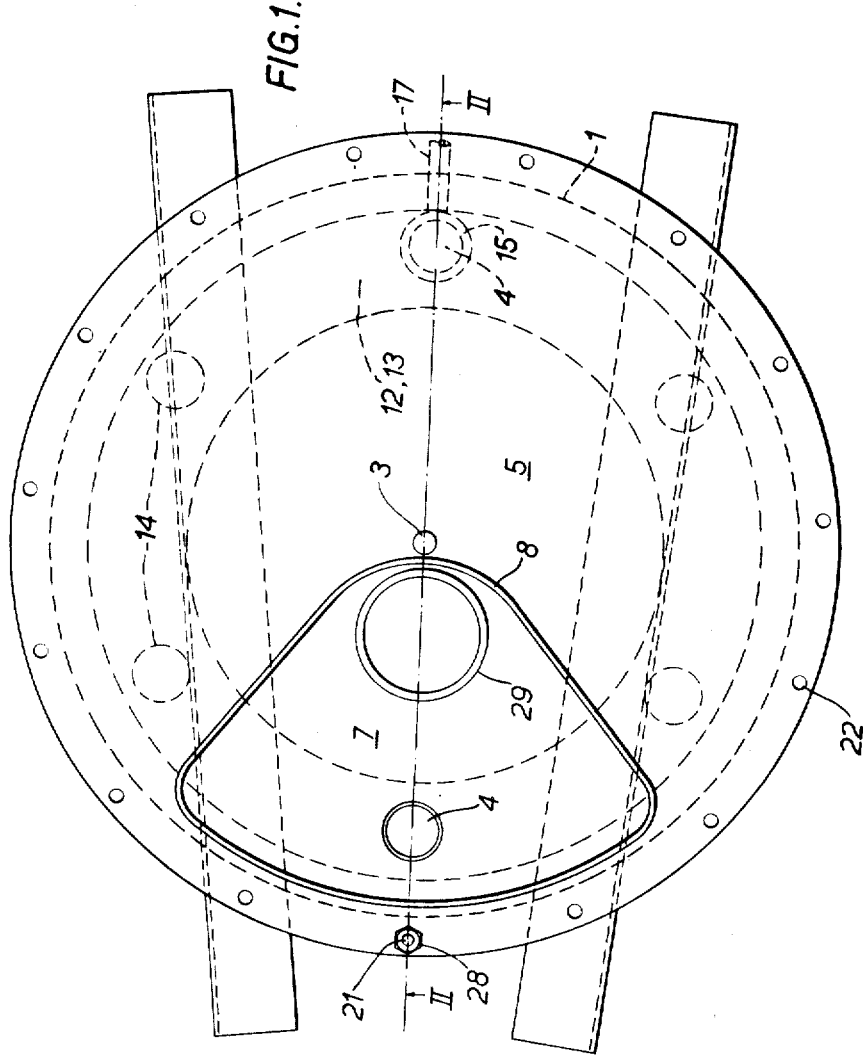

United States Patent Office 3,321,409
Patented May 23, 1967

3,321,409
PRODUCTION OF RADIOACTIVE FUSED GLASS BODIES
John Roger Grover, Tilehurst, near Reading, and Malcolm MacKenzie, Derby, England, assignors to United Kingdom Atomic Energy Authority, London, England
Filed Aug. 31, 1964, Ser. No. 393,102
Claims priority, application Great Britain, Sept. 17, 1963, 36,569/63
14 Claims. (Cl. 252—301.1)

The present invention relates to the production of bodies of fused glass and is particularly concerned with fused glasses containing radioactive materials.

In our co-pending patent application Ser. No. 299,835, now abandoned in favor of Ser. No. 480,432, we have described a new composition of matter which comprises a fused glass containing 20 to 50% by weight of waste oxides. The term "waste oxides" is defined herein as the radioactive mixture of oxides which may be obtained from the waste or effluent resulting from the treatment to remove the uranium and plutonium from irradiated uranium and the term "waste oxides" as used herein should be interpreted as in accordance with this definition. It should however be appreciated that although an aqueous slurry of the waste oxides may be used, the waste oxides are normally found in solution in the effluent as nitrates, and when heated, these nitrates will be broken down to give the oxides.

An object of the present invention is to provide an improved glass-forming process.

According to the present invention there is provided a method for the production of a radioactive fused glass containing waste oxides, comprising introducing into a container an aqueous solution containing the waste oxide constituents of the said radioactive fused glass, separately feeding into the container solid bodies containing the inactive constituents of the said radioactive fused glass, and heating the said container to effect, in turn, removal of the water content and fusion of the inactive constituents with the waste oxide constituents to form the radio active fused glass.

The container in which the active glass is formed is desirably made of stainless steel. The glass compositions used in the process of the present invention may, if desired, be those described in our said application. As explained in the said application, it is desirable that the glass formed should have leach-resistant properties, and one suitable glass possessing such properties is based on borax and has a composition by weight of borax 40%, silica 20% and waste oxides 40%.

The solid bodies may be in any convenient form, for example, spheres of about 2 cms. diameter or pellets. The bodies may consist of a compact of the glass forming oxides or a fused glass produced from a molten inactive glass. The bodies, in either case, will contain all the active glass constituents except for the waste oxides, and thus in the case of the borax glass, the bodies will contain borax and silica in the requisite proportions or alternatively boric acid glass, sodium carbonate (together giving borax) and silica.

The feed containing the waste oxide constituents of the fused glass may comprise a slurry of the waste oxides in neutral or alkaline aqueous solution or a solution of the corresponding nitrates in aqueous nitric acid solution. If the nitric acid solution has been subject to considerable concentration, then the solubility of some materials in the solution will be exceeded and these materials will be precipitated from the nitric acid solution. In such a case the feed of waste oxide constituents would comprise a slurry of the less soluble components in a nitric acid solution containing the more soluble components. Although the present invention is described in respect of the use of unsaturated nitric acid solutions, the scope of the invention also extends to the use of a waste feed in which all or part of the waste is in the form of a slurry.

When the container in which the active glass is to be formed is heated, the water of the waste oxide solution is first driven off and the nitrates contained in the waste decompose to form the waste oxides, oxides of nitrogen also being evolved. Some of the waste oxides are volatile, for example ruthenium oxide, and thus it is essential to prevent the escape of vapours from the container into the atmosphere, since these vapours will be corrosive and radioactive. Such an escape of vapours could take place up the feed tube through which the solid bodies are introduced into the container, if the pressure within the container is in excess of atmospheric pressure. Although the container is designed to be maintained at a pressure below atmospheric, it is nevertheless desirable to provide a sealing device in the feed tube. Such a sealing device is intended to prevent or reduce the escape of vapours from the container in the event of a blockage of the lines connecting the container to a pump for maintaining the reduced pressure in the container, it being appreciated that such a blockage could lead to a subsequent increase in pressure within the container. Very conveniently the sealing device may be synchronised to operate in dependence on a feeding mechanism for introducing the solid bodies into the feed tube and may even be incorporated into such feeding mechanism.

The use of a separate feed of solid bodies results in an increased rate of formation of active glass compared with the same cylinder and heater when a slurry of glass forming oxides is used, since the heat which was previously expended in boiling off the water of the slurry is no longer required for this purpose and may thus be used to evaporate the active solution and decompose the solid nitrates to the oxides.

The size of the solid bodies used, although not critical, should be such that a good distribution of the waste oxides throughout the active glass is obtained, and also such that a manageable feed rate of the solid bodies may be used. With small bodies, a high rate of feed would be required and since this would require a complex feeding mechanism, it is desirable to use comparatively large bodies. However, to obtain even distribution of the waste oxides throughout the active glass, it is desirable to use a small body size. Thus, the body size must be optimised to combine a reasonable rate of food with a good distribution of the waste oxides in the active glass and accordingly spheres of 2 cm. diameter are preferred.

The use of a solid feed in the form of a fine powder is considered undesirable since such a feed would result in an undesirably high feed rate and also in a rapid deterioration in the efficiency of the sealing device, since the fine powders would tend to stick to the seals and destroy them.

If the solid feed is in the form of a compact of glass forming oxides, there may be a tendency for the surface of such a compact to break up to produce a fine powder with the resultant undesirable effect on the sealing device hereinbefore described. This effect is avoided if the solid feed consists of bodies of a fused glass formed from the inactive glass-forming oxides. However, although the use of fused glass bodies overcomes the disadvantage of powdering of the surface layers, the product obtained from such fused glass bodies tends to be less homogeneous than the product obtained under the same conditions using the compacted oxides. Thus, it is preferred that the solid feed should be a compact to give the minimum segregation in the product and that the compact should be treated to minimise powdering of the surface layers. Such treatment may involve forming the compact by hot pressing, forming a glaze on the outside of the compact or by providing the compact with a coating or casing of a metal which rapidly dissolves in nitric acid. Thus, with a borax-silica-waste oxide product, the solid feed could be a compact of boric acid glass ($B_2O_3$), sodium carbonate and silica hot pressed at about 300° C. and 300 p.s.i. At the temperature of pressing the boric acid glass is close to its melting point and undergoes partial fusion to hold the compact together. The boric acid glass and sodium carbonate are the borax-forming constituents of the compact and in the nitric acid solution in the steel containing vessel in which the active glass is being formed, the sodium carbonate reacts and evolves gases which cause the break-down of the compact into powder form which thereby results in the minimum amount of segregation in the active glass product.

In order that the present invention may more readily be understood, one embodiment of a feed mechanism for carrying out the invention will now be described by way of example, reference being made to the accompanying drawings, wherein:

FIG. 1 is a plan view of a feeding mechanism for spherical bodies, and

FIG. 2 is a cross-section along the line II—II of FIG. 1.

Referring to FIGS. 1 and 2, the feeding mechanism comprises a brass disc 1 secured on an integral boss 2 on a brass spindle 3 which passes through a central hole in the disc 1. The disc 1 is fixed to the boss 2 of the spindle 3 by means of a silver braze. Six equal countersunk holes 4 are spaced near to the edge of the disc 1. The holes 4 are equidistant from the centre of the disc 1 and are spaced at equal intervals round the disc. The spindle 3 passes through holes in an upper plate 5 and a lower plate 6 which are respectively situated above and below the disc 1. The plates 5 and 6 are circular and have a larger diameter than the disc 1. A sector-shaped opening 7 is provided in the upper plate 5, this opening extending beyond the position of the holes 4 in the disc 1, but not extending up to the circumference of disc 1. The edge of the opening 7 is surrounded by a brass shield 8, which is brazed to plate 5. The region defined by the shield 8 forms a loading hopper 9, into which the spherical bodies, e.g. glass spheres, are placed.

Grooves 10 and 11 are cut into the surfaces of plates 5 and 6 which are adjacent to the disc 1. The groove 11 forms a complete circle in the plate 6, but groove 10 does not form a complete circle due to the opening 7. The grooves are positioned so that their centre lines coincide with the centre of the holes 4 in the disc 1. The width of the grooves 10 and 11 is greater than the diameter of the holes 4. Into the grooves 10 and 11 are placed gaskets 12 and 13 respectively. The gaskets 12 and 13 are slightly thicker than the depth of grooves 10 and 11, and are thus slightly raised above the surfaces of the plates 5 and 6. The gaskets are held in position by a number of brass countersunk head screws 14.

A hole 15 passes through the lower plate 6, this hole being at the same radius as the holes 4 in disc 1. The hole 15 has a diameter which is intermediate between that of the holes 4 and the width of grooves 10 and 11. The hole 15 is at the point furthest removed from loading hopper 9 and a stainless steel feed tube 16 is fixed into the hole 15 by brazing. A copper side arm 17 is fixed in position in the upper part of the feed tube 16. A hole 19 passes through the gasket 13 in a position corresponding to that of the feed tube 16. The feed tube 16 is provided with a pair of plug valves 18 and 20, the purpose of which will be described hereafter.

Feed tube 16 forms the offtake tube for the spherical bodies and is connected to the container in which the active glass is formed (not shown). The side arm 17 is connected to a source of compressed air (not shown) and provides a purge flow which prevents vapours escaping from the container in which the active glass is being formed.

The whole assembly is fastened together by means of a series of fifteen brass bolts 21 which pass through corresponding holes 22 and 23 in the plates 5 and 6 respectively. The holes 22 and 23 are spaced at equal intervals around plates 5 and 6 and are positioned outside the circumference of disc 1. Each bolt 21 is firmly held to the lower plate 6 by a thin brass nut 24. A spring 25 is placed on the screw 21 between two brass washers 26 and 27, and compressed by means of a brass nut 28. The compression provided by the springs 25 and nuts 28 produces a tight seal between the gaskets 12 and 13 and the upper and lower surfaces of the disc 1. Since the disc 1 has to rotate between the plates 5 and 6, in contact with the gaskets 12 and 13, the compressions provided by springs 25 and nuts 28 is made sufficient to produce a tight seal between the gaskets and the disc, but not sufficient to prevent the disc from rotating. The disc 1 may be caused to rotate by connecting spindle 3 to a suitable driving mechanism or, alternatively, by means of a pinion which engages with teeth on the periphery of the disc 1. In either case, the driving mechanism is arranged to cause the disc to rotate at a constant speed, so that the rate at which the spheres are fed into the cylinder is also constant. The driving mechanism is also connected to the valves 18 and 20 such that these valves operate in dependence on the speed of rotation of the disc 1.

The quantity of spherical bodies in the loading hopper 9 is maintained substantially constant by feeding the bodies into the hopper through a tube 29. The tube 29 is positioned within the hopper 9 at a distance above the disc 1 which is in excess of the diameter of the bodies, not greater than twice the diameter of the bodies.

When the feeding mechanism is in operation, the spherical bodies are introduced into the hopper 9 by means of the tube 29, an excess of bodies being contained within the tube 29. The disc 1 is caused to rotate and thus each of the holes 4 passes beneath the hopper 9 in turn. As each hole 4 passes beneath the hopper 9, one of the bodies in the hopper falls into the hole which has a diameter which is a little in excess of that of the bodies, the depth of the holes 4 also being a little in excess of the diameter of the bodies. The spherical body is carried in the hole 4, between the gaskets 12 and 13, until the hole 19 through gasket 13 is reached. The body falls through this hole and into the feed tube 16.

The valves 18 and 20 are synchronized, through the driving mechanism, to the rotation of the disc 1 in such a way that when one of the holes 4 is wholly or partially over the hole 19, the valve 18 is closed. Thus the body falls from the hole 4, through the feed tube 16 as far as the valve 18. The side arm 17 maintains the pressure in the upper part of feed tube 16 in excess of the maximum permitted pressure in the steel containing vessel in which the active glass is being formed. Thus, if the maximum permitted pressure in the steel containing vessel is 10 p.s.i. above atmospheric then the side arm 17 is conveniently connected to a compressed air supply of pressure 20 p.s.i. above atmospheric, to ensure that there will be no escape of noxious or radio-active vapours through the feed tube 16.

When the mole 4 moves away from the hole 19, thereby sealing the top of the feed tube 16, the driving mechanism causes the valve 18 to open, the valve 20 being closed at this time. The body thus falls as far as the valve 20 and compressed air passes from the upper part of tube 16 into the region between the two valves so that the pressure rises to that of the compressed air supply. The valve 18 then closes and valve 20 opens thus permitting the body to fall freely into the steel containing vessel. The air flow also passes towards the containing vessel due to the pressure differential between the upper portion of the feed tube 16 and the containing vessel. The valve 20 then closes and the cycle is repeated.

It will be appreciated that the sequence of opening and closing the valves ensures that there is no direct contact between the containing vessel and the atmosphere, and that the compressed air supplied through the side arm 17 prevents back diffusion of noxious vapours through the "airlock" defined between valves 18 and 20.

Within the container, the temperature is above the melting point of the constituents of the spherical bodies, but the bodies may take an appreciable time to reach this temperature. When the bodies melt or break up into smaller particles, they incorporate the layer of waste oxides which has formed upon the surfaces of the bodies as a result of the evaporation and decomposition of the solution containing the waste oxides. When the container has been filled, the feed of waste oxide solution and solid particles is ceased, and the temperature of the container raised sufficiently to fuse any remaining solid matter and permit the diffusion of the active waste oxides through the fused glass.

Although the present invention has been particularly described using spherical bodies as the solid feed, it should be appreciated that the glass forming oxides may be introduced into the container as a solid feed in any form, for example as pellets, without departing from the scope of the present invention..

We claim:

1. A method for the production of a radioactive fused glass containing inactive glass forming oxides and radioactive waste oxides arising from the processing of an irradiated nuclear fuel, said method comprising the steps of pasisng a radioactive waste oxide containing aqueous solution arising from the processing of an irradiated nuclear fuel into a container, separately feeding into said container unslurried, solid, substantially dry particles consisting of a mixture of inactive glass-forming compounds, heating said container to effect removal of the water content of the said aqueous solution and continuing heating to effect complete fusion of the inactive glass-forming compounds and waste oxides to form a radioactive fused glass.

2. The method of claim 1 wherein said particles are spherical particles.

3. The method of claim 2 wherein the spherical particles are formed of a fused glass of the inactive glass-forming compounds.

4. The method of claim 1 wherein said particles are compacts of a mixture of powders of the inactive glass-forming compounds.

5. The method of claim 4 wherein the compacts are provided with a wear-resistant outer layer whereby the compact will not disintegrate and powder upon feeding into said container.

6. The method of claim 5 wherein the said outer layer is a glaze or metal coating on the compacts.

7. The method of claim 1 wherein all the inactive glass-forming compounds are oxides.

8. The method of claim 1 wherein the inactive glass-forming compounds are borax and silica.

9. The method of claim 1 wherein the inactive glass-forming compounds are boric acid glass, sodium carbonate and silica.

10. The method of claim 1 wherein said container is a stainless steel container.

11. The method of claim 1 wherein said particles are spherical particles having a diameter of about 2 centimeters.

12. A method for confinement and isolation of radioactive waste products arising from the processing of irradiated nuclear fuel comprising the steps of feeding a radioactive waste oxide containing aqueous solution into a container, separately and simultaneously feeding a mixture of unslurried, solid, substantially dry particles into said container, said mixture of particles consisting of inactive glass-forming compounds, simultaneously heating said container to a temperature above the melting point of the particles wherein the aqueous solution will evaporate and the particles will fuse together, and subsequently upon completion of the feeding continuing heating to effect complete fusion of the inactive glass-forming compounds and waste oxides to form a radioactive glass body.

13. The method of claim 12 wherein the particles are fed into said container through a means which will prevent back diffusion of vapors of the solution being vaporized in said container.

14. The method of claim 12 wherein the particles are spherical particles of inactive glass-forming compounds selected from the class consisting of boric acid glass, sodium carbonate, silica and mixtures thereof.

References Cited by the Examiner

UNITED STATES PATENTS

| | | | |
|---|---|---|---|
| 3,032,428 | 6/1962 | Ginther | 252—301.1 |
| 3,116,131 | 12/1963 | Beerman | 252—301.1 |
| 3,265,627 | 8/1966 | Clark et al. | 252—301.1 |

OTHER REFERENCES

Atom, vol. 56, June 1961, pp. 18–21.

CARL D. QUARFORTH, *Primary Examiner.*

BENJAMIN R. PADGETT, *Examiner.*

S. J. LECHERT, JR., *Assistant Examiner.*